Figure 1:
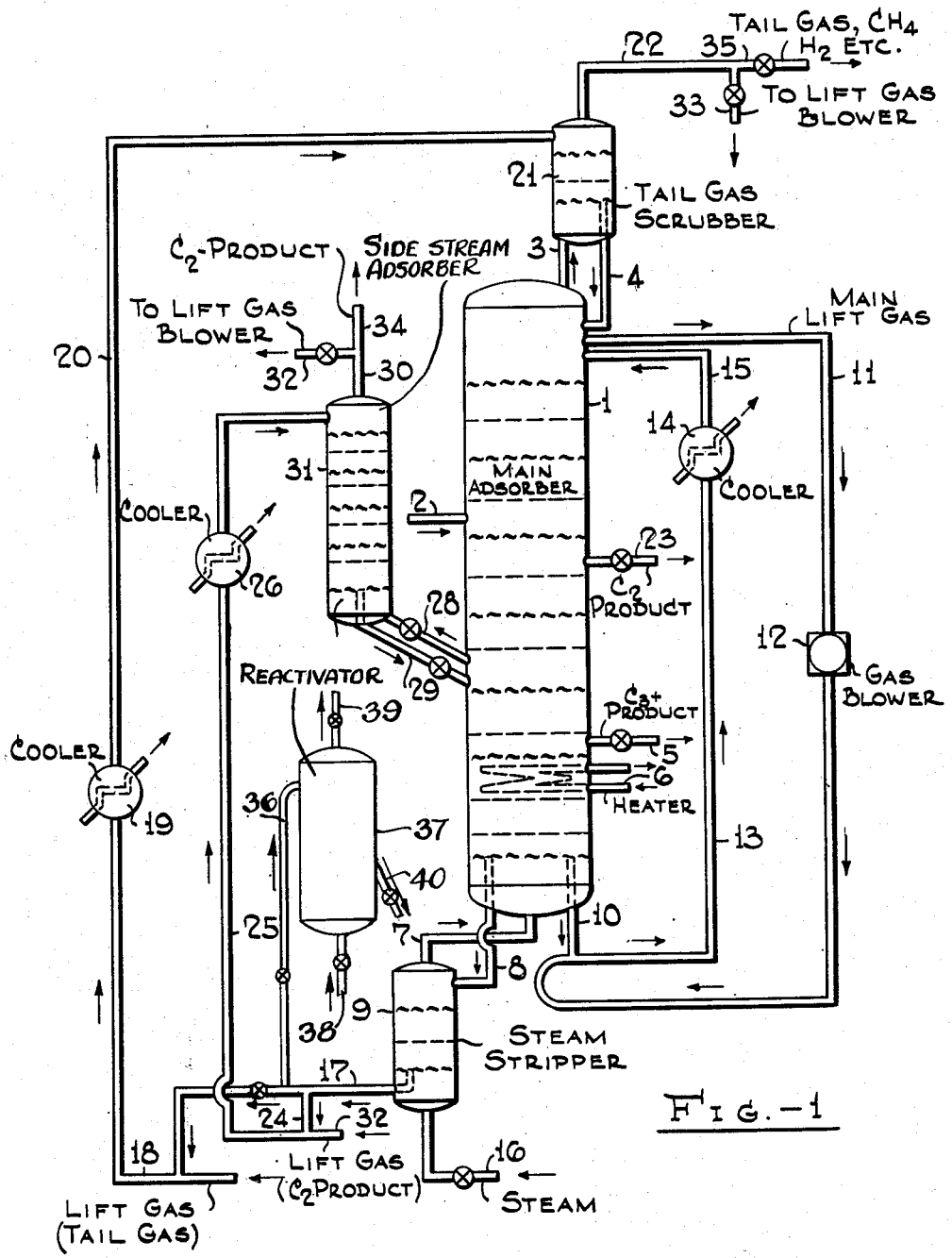

Jan. 19, 1954

R. P. CAHN ET AL 2,666,500

ADSORPTION PROCESS

Filed Oct. 16, 1950

2 Sheets-Sheet 1

Robert P. Cahn
Lewis D. Etherington  Inventors

By Henry Berk  Attorney

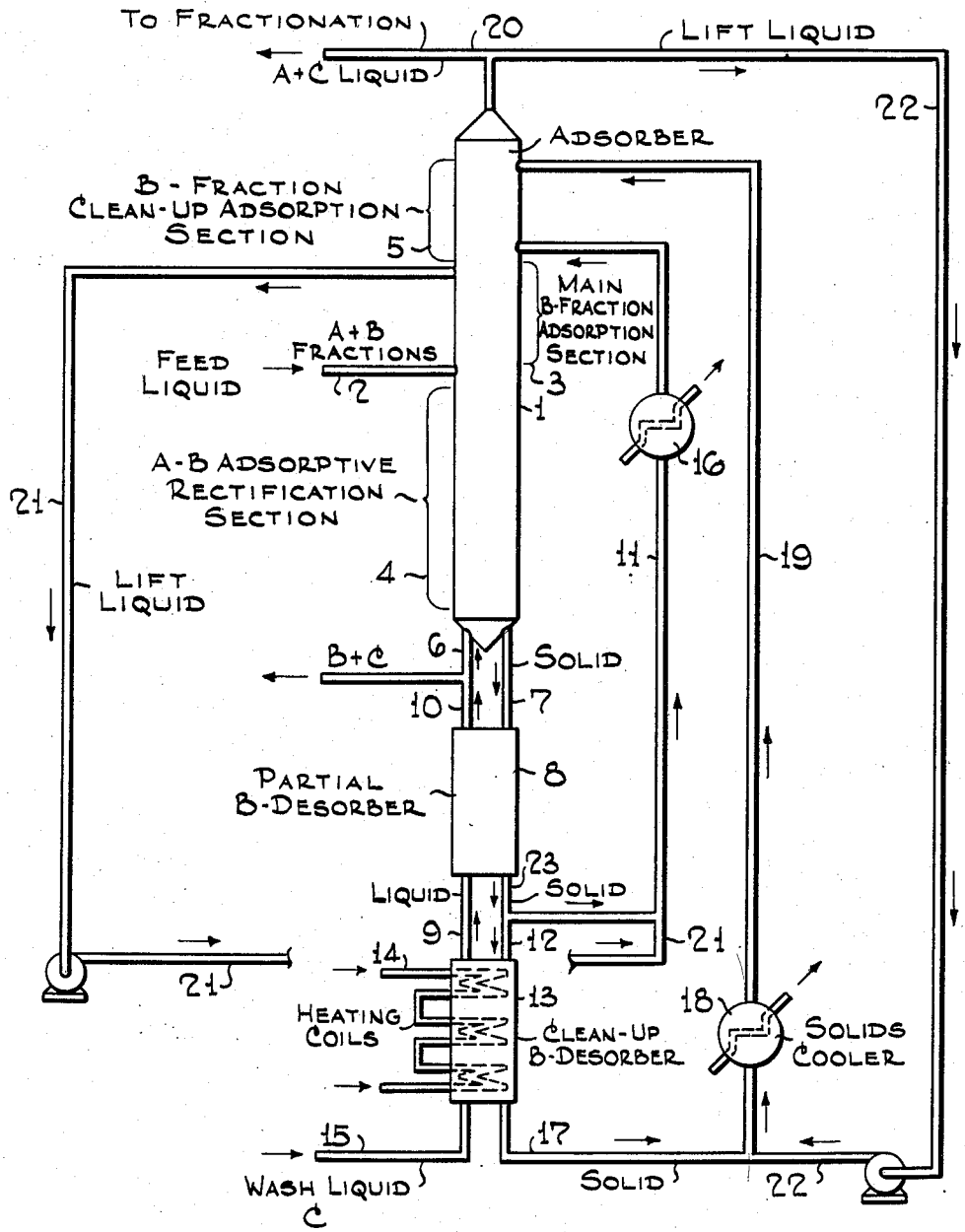

Patented Jan. 19, 1954

2,666,500

UNITED STATES PATENT OFFICE 2,666,500

ADSORPTION PROCESS

Robert P. Cahn, Elizabeth, and Lewis D. Etherington, Cranford, N. J., assignors to Standard Oil Development Company, a corporation of Delaware Application October 16, 1950, Serial No. 190,292

11 Claims. (Cl. 183—114.2)

This invention is concerned with an improved adsorptive separation process in which the bottoms product or heaviest component of the mixture undergoing separation is partially desorbed from the circulating adsorbent and more completely desorbed from a remaining fraction of the adsorbent. More particularly the invention relates to a process for reducing the losses of the heaviest components of the mixture undergoing separation in a solid adsorption process, and in so doing to minimize desorption requirements, and reduce contamination of lighter products by the heaviest product.

It is an object of this invention to provide a highly stripped adsorbent without an increase in the overall stripping requirements of an adsorption-desorption process for the separation of fluid mixtures. It is an object of this invention to reduce the loss of bottoms product from the overhead product by means of this highly stripped adsorbent. It is an object of this invention to provide a process for the production of a highly purified intermediate fraction from a mixture containing slightly, medium and strongly adsorbable fractions by means of this highly stripped adsorbent. It is a further object of this invention to provide a highly stripped adsorbent to a regeneration or high temperature heating step in order to reduce the loss of heavy component by combustion or otherwise.

These and other objects of the invention will be apparent from the description to follow.

The process of separating components of mixtures, both liquid and gaseous, by means of solid adsorbents has been well described. It is known that components of a mixture having varying degrees of adsorbability may be separated by contacting the mixture with a solid adsorbent whereby the more adsorbable component is adsorbed by the solid in preference to the less adsorbable component. The solid is then treated to recover the more adsorbable component therefrom in a process called desorption. The latter is usually accomplished by heat and/or stripping with steam or inert gas, or by means of washing with hydrocarbons, oxygenated hydrocarbons or water in liquid form. It is well known that gaseous or liquid hydrocarbon mixtures are separated into their components by treating them in intimate contact with solid adsorbents particularly activated carbon, silica gel, etc. In general it may be said that the activated carbons separate the hydrocarbons roughly by molecular weight, the higher molecular weight components of the hydrocarbon mixture being more selectively adsorbed by the carbon. On the other hand silica gel usually displays an affinity for the olefinic or more unsaturated type in preference to the less unsaturated or paraffinic type.

In the selective separation of hydrocarbons by contacting a gaseous stream comprising them with activated carbon in a cyclic process in which the carbon saturated with adsorbed components is desorbed by stripping, e. g. with steam and heat, and returned to the adsorption zone, as will be more fully described below, it is usually not economically feasible to completely remove the adsorbed hydrocarbons from the total circulated activated carbon in the desorption zone. A certain amount of these hydrocarbons, therefore, are recycled with the adsorbent to the top of the adsorption zone and are lost to the light components or tail gas by partial stripping of the adsorbent by the overhead product. In order to avoid this loss, part of the adsorbent, preferably about 20 weight per cent or thereabouts, leaving the high temperature steam stripping or desorption zone is contacted with the total steam in a separate vessel, separate stage or stages prior to injection of this same steam into the desorption section proper. This additional stripping operation removes more completely the heavy component and leaves a charcoal substantially free of adsorbed bottoms components. This specially stripped charcoal is highly suitable for return to the adsorption system at points where its effectiveness can be most highly utilized. It is employed to scrub the tail gas emerging from the adsorption zone whereby it completely adsorbs the heavy components present in the tail gas. It is also employed in a secondary adsorber to strip unavoidable equilibrium quantities of the heavier component from a primary adsorber sidestream thereby permitting the production of a highly purified intermediate component fraction.

The invention will be more readily understood when the description of the same is read in connection with the drawings in which the figures represent elevation views in cross section of equipment adapted to carry out the process. Figure 1 represents a flow plan for carrying out the invention in a vapor-solid system; while Figure 2 represents a liquid-solid system.

Referring to Figure 1 of the drawing numeral 1 represents an adsorption-desorption column supplied with a feed line 2, overhead product draw-off pipes 3 and 11, middle sidestream product draw-off pipes 23 and 28, lower bottoms product draw-off pipe 5, a heater 6, a steam entry pipe 7, solids entry pipes 4, 15 and 29, and solids draw-off pipes 8 and 10. A separate desorption vessel 9 is provided to receive a minor amount of the solids leaving vessel 1 via pipe 8. The stripping vessel 9 is equipped with a pipe 16 for admittance of stripping gas.

Employing the equipment of the drawing, the invention will be illustrated with respect to the resolution by means of charcoal adsorption of a gaseous hydrocarbon mixture containing a light fraction, namely methane and attendant non-condensible gases such as hydrogen, nitrogen, etc., an intermediate fraction consisting of $C_2$ hydrocarbons, viz., ethane and ethylene, and a heavy or bottoms product fraction consisting of $C_3$ and heavier hydrocarbons, viz., propane, propylene, butane, butenes, etc. A gaseous mixture of such composition is introduced into vessel 1 via pipe 2 at a point slightly above the mid-section thereof. The bulk of the circulated activated charcoal adsorbent is introduced into the vessel 1 at the top thereof via line 15 with recycle lift gas obtained through line 11. Vessel 1 may be constructed to handle fluidized charcoal in which event true countercurrent flow of charcoal and feed gas is effected by providing the adsorption vessel with perforated plates, bubble-capped plates, baffles, or stationary packing. The plates are equipped with weirs and downcomers to facilitate flow of the charcoal from an upper to a lower plate consecutively down the tower. The plates are so constructed as to enable upwardly flowing gases to flow through the openings thereof while not allowing passage of the charcoal downwardly therethrough. The charcoal therefore builds up on the plates until the level of the weir is reached whereupon the char flows down the downcomer to the plate immediately below. In such an operation finely-divided fluidized charcoal of 50-200 micron particle size is preferably employed and the charcoal is fluidized by the process gas undergoing separation. Alternatively, the adsorption vessel may be operated as a soaker-type vessel in which charcoal is packed in the tower and allowed to gravitate slowly at a fixed rate from the top to the bottom of the tower. In this event charcoal of approximately 10 to 30 mesh particle size is employed. The adsorption tower may be visualized as consisting of three zones in each of which a specific function is performed. The zone above the gas feed line 2 is the adsorption zone proper, while the zone immediately below the gas feed line and extending to the bottoms product draw-off line 5 is a rectification zone. The zone below the $C_3$ and heavier product draw-off line extending to the bottom of the vessel and containing the heater and steam entry lines is the desorption zone proper.

Returning to the drawing the charcoal descending the tower countercurrently contacts the upwardly rising bases introduced via pipe 2. The charcoal more selectively adsorbs the heavier components of the gaseous feed so that the $C_2$, $C_3$, and heavier components are preferentially adsorbed, with relatively small equilibrium quantities of the methane and lighter gases, while the bulk of the latter pass up the tower and leave the vessel via line 3. The charcoal containing the adsorbed components passes down the tower past the feed pipe into a portion of the rectification zone between lines 2 and 28 wherein the charcoal is refluxed by predominantly $C_2$ and heavier hydrocarbon vapors passing up the tower from the desorption zone as will be further explained below. These vapors tend to release methane from the charcoal in the upper portion of the rectification zone and are themselves readsorbed. A $C_2$-hydrocarbon vapor stream, containing essentially no methane but unavoidable equilibrium amounts of $C_3$ and heavier hydrocarbons is removed from the vessel 1 via pipe 28 or via pipe 23, as described further below. The charcoal continues its descent through the remaining portion of the rectification zone between lines 28 and 5 wherein refluxed $C_3$ and heavier hydrocarbon desorbs the intermediate $C_2$ fractions while $C_3$ and heavier hydrocarbons are readsorbed. The char then reaches the bottom portion or partial desorption zone below line 5 and containing heater 6. In this region the charcoal is heated to approximately 450-550° F. to partially release the adsorbed components thereon, chiefly the $C_3$ and higher hydrocarbons. Assisting the heat in this regard is the stripping action of steam or other gas introduced into the bottom of the vessel via line 7. The released $C_3$ and heavier hydrocarbons are removed from the tower via line 5 although a portion of them pass up the tower to serve as reflux as previously mentioned. The action of the heat and stripping steam removes the bulk of the adsorbed $C_3$ and heavier components from the charcoal, but does not completely strip these components off the char. Now, a portion of the hot charcoal is removed from the desorption section via line 8 and introduced into a smaller stripping vessel 9 entering at a point near the top thereof. This vessel is likewise constructed and operated so as to provide countercurrent contact of charcoal and stripping agent, e. g., steam entering the bottom of the vessel via line 16. The amount of charcoal introduced into the vessel 9 is approximately 10-40 weight per cent of the total char leaving the adsorption vessel 1. Preferably about 20 weight per cent of the charcoal is introduced into vessel 9, depending largely on the feed gas composition and the total requirement of specially stripped char in the overall process. Here the withdrawn charcoal is stripped with the total stripping steam prior to the introduction of this same steam into the partial desorption section where the bulk of the desorption is performed. By this method part of the charcoal is contacted with the total steam and is thus more completely desorbed and represents a more purified char whose capacity for heavy hydrocarbon components has been more completely restored and will thus permit good clean-up operation for the removal of traces of heavy component from other streams, where its presence is undesirable or wasteful. It will be seen that if 4 mols of steam per 1000 lbs. of char is employed in the partial desorption section, then 20 mols per 1000 lbs. of char will contact the 20% withdrawn charcoal in the vessel 9. In this manner the same overall amount of stripping steam is utilized but it is employed more efficiently. The total steam with desorbed $C_3$ and heavier vapors leave vessel 9 via line 7 and is introduced into the desorption section of vessel 1 to strip the total charcoal therein. The less completely stripped char representing 60-90 weight per cent, preferably about 80 weight per cent, of the total charcoal circulating in the system is removed from vessel 1 via line 10. This char is returned to the top of the adsorption zone by means of the lifting action of a portion of the light gases (tail gas) withdrawn from the tower 1 via line 11 and repressured via blower 12. The compressed gas picks up the hot charcoal as it emerges from the bottom of the vessel via line 10 and lifts it via line 13 through cooler 14, wherein the charcoal is cooled down to a temperature of approximately 100–200° F. and then introduced via line 15 to the top of the adsorption zone of tower 1 to repeat the adsorption cycle.

Returning now to the stripping vessel 9 the hot, completely stripped charcoal is removed from the vessel via pipe 17. Disposition of this char is determined by the manner in which the separation process is being carried out. A number of alternatives singly or together is employed. If a high $C_3$-recovery is desired purified repressured tail gas consisting substantially of methane and lighter components drawn from pipe 22 via pipe 33 is introduced via line 18 to serve as lift gas to convey the hot charcoal through cooler 19 and line 20 to scrubber 21. The cooled char, at a temperature of about 100°–200° F., preferably about 125° F., enters scrubber 21 at a point near the top thereof and flows downwardly through the vessel countercurrent to the hydrocarbon gas entering the bottom of the vessel from the adsorption vessel via line 3. The char, since it has been specially stripped of $C_3$ and heavier hydrocarbons in stripper 9, is particularly adaptable to the $C_3$ clean-up of the lean gas emerging from the adsorption zone. The char picks up some $C_2$ and particularly any $C_3$ hydrocarbons present in the gas, leaving $C_1$ and some $C_2$'s as substantially the only hydrocarbon components of the purified gas leaving the scrubber via line 22. The char reaching the bottom of the tower contains some small amounts of adsorbed $C_2$ and $C_3$ hydrocarbons and contains substantially the same specific quantity of $C_3$ per unit char as the char entering vessel 1 via line 15. This charcoal, therefore, is removed from vessel 21 via line 4 and introduced into vessel 1 at the top thereof where it mingles with the other char and repeats the adsorption cycle.

In the event that the process is being operated to obtain an intermediate component of extremely high purity another feature of the invention is employed. According to this modification a sidestream adsorber 31 is employed, and the $C_2$ product draw-off pipe 23 is closed off. A portion of the highly stripped char is removed from line 17 via line 24 and with the aid of repressured purified $C_2$ hydrocarbon gas (from line 32) is lifted via line 25 to cooler 26 to reduce the char temperature to the proper adsorption level of 100–200° F., preferably about 125° F. The cool char is carried through pipe 27 into adsorber 31 entering at the top thereof. The char descends the tower in the same manner as in vessels 1, 9, and 21. A vapor stream comprising essentially only $C_2$, $C_3$ and heavier components is withdrawn from a plate in vessel 1 below the feed plate 2 preferably at a point where the $C_1$ concentration in the rising vapor has been reduced to a very low value and allowed to pass upwardly into adsorber 31 via line 28. The descending char adsorbs the countercurrently-flowing gas of the heavier components, viz., $C_3+$ allowing a purified $C_2$ stream to emerge via line 30. The descending char is returned via line 29 to the main adsorption vessel 1 at a point below the point of vapor withdrawal from the vessel. At this point the chars in the main tower and the sidestream adsorber are of the same approximate composition and descend through the main tower 1 to undergo desorption as previously recited. Also the stripped char is suitable for high temperature regeneration as any other char used for this would result in a certain amount of bottoms products loss due to incomplete adsorption.

The process described permits the minimizing of $C_3+$ losses from the system, and assures the attainment of any desired degree of purity of the $C_2$ sidestream product without resorting to excessive amounts of stripping steam or to an excessive number of plates in the desorption section of the main adsorber. For a high purity $C_2$ product an appreciable savings in stripping steam requirements can be realized at the expense of a slightly higher char circulation rate due to the residual $C_3$ and heavier components recycled with the bulk of the circulating char. This can be carried out by reducing the amount of stripping steam and/or heat introduced into the system resulting in a somewhat larger amount of residual $C_3$ recycled with the bulk of the char to adsorber 1 with a concomitant small rise in char circulation. However, normal purity of the products can be maintained by performing an additional adsorption on the sidestream char and on the tail gas clean-up char as described above. In connection with the discussion of the process of Figure 1 it should be borne in mind that it is possible to combine vessels 1, 9, and 21 into a single unitary vessel without entailing any changes in the invention.

The process of the invention is also adaptable to the separation of liquid mixtures in a liquid-solid system. For example, the separation of a mixture comprising a less adsorbable component A and a more adsorbable component B employing charcoal as the adsorbent is carried out in the equipment shown in the flow-plan of Figure 2. The liquid feed is introduced into vessel 1 via line 2 and is contacted with solid adsorbent descending the tower. In this operation a moving bed of granular adsorbent is employed, or a slurry of finely-divided adsorbent and the less adsorbable component A is suitable. The solid in the main adsorption section 3 preferentially adsorbs the more adsorbable component B together with an equilibrium amount of component A. The adsorbent passes down the vessel below the feed line into a rectification section 4 wherein the solid is refluxed with liquid consisting substantially of component B entering the section via line 6. Component B displaces component A from the solid and the latter passes up the tower into a clean-up section 5 wherein any remaining traces of component B are scrubbed out by solid adsorbent circulating from the top of the tower as will be related below. The adsorbent saturated with liquid component B passes from vessel 1 via line 7 into partial desorber 8 entering the top thereof. In this vessel component B is partially desorbed from the solid in a physical operation entailing sweeping of the solid with a liquid wash liquid C introduced in sufficient volume via line 9. Heat may be applied to the vessel to assist in this operation if desired. Wash liquid C is preferentially a liquid boiling lower than components A and B and is less adsorbable than either A or B. A liquid stream of B and C is removed from vessel 8 via line 10 and is sent to a fractionator (not shown) for separation of B and C. The latter is returned to the system via line 15. Part of the stream is removed via line 6 and serves as reflux to the rectification section 4. The partially desorbed solid is withdrawn from vessel 8 via line 23 and is separated into two streams. The bulk of the solid (for example, 60–90 weight per cent) is withdrawn via line 11 and is recirculated, with recycle lift liquid via 21 and after cooling in cooler 16, to the top of the adsorber section proper, being introduced at a point between the clean-up section 5 and adsorber section 3. The balance or minor portion of the partially desorbed solid is introduced via line 12 into a clean-up desorber 13 equipped with heating coils 14. Into the bottom of vessel 13 there is introduced under pressure via line 15 wash liquid C which is introduced in sufficient volume to physically desorb substantially completely component B from the solid by a washing action. This wash liquid which has substantially completely stripped component B from the solid is then introduced, in toto, via line 9 to partial desorber 8 wherein it contacts the total solid stream in a partial desorption operation as related above. The completely desorbed solid which now possesses its complete adsorbing capacity for component B is removed from clean-up desorber via line 17 with lift liquid via line 22, cooled in cooler 18 and introduced via line 19 into the top of the clean-up adsorber section 5. This solid acts to pick up any component B which through incomplete adsorption or otherwise enters the light liquid and tends to pass overhead therewith.

Now, the bulk of the wash liquid C is removed with the product B via line 10. However, each of the circulating solid streams introduced into the upper section of the vessel 1 via lines 11 and 19 contain certain amounts of component C. Since this component is lighter boiling than A and B and since it is less adsorbable than these components it passes overhead from vessel 1 through line 20 with unadsorbed component A. This liquid is sent to a fractionator not shown for separation of A and C. The latter is returned to the system via line 15.

The system described is adequately suitable for the separation of heptane (B) from isooctane (A) using charcoal as the solid adsorbent and employing pentane (C) as the wash liquid. Similarly, toluene (B) is separated from a mixture with methyl cyclohexane (A) employing silica gel as the adsorbent and hexane or pentane as the wash liquid.

Although the liquid-solid system has been described for separating a mixture of two components, three or more fractions can be recovered from a mixture containing them by providing one or more sidestream product withdrawal points as illustrated in Figure 1. Likewise the process of Figure 1 is operated to separate more than three components by providing additional spaced sidestream draw-offs from rectification sections in vessel 1.

As previously recited in connection with the discussion of the process of Figure 1 it should be borne in mind that it is possible to combine vessels 1, 8 and 13 into a single unitary without entailing any changes in this phase of the invention.

Cooling of the recycled adsorbent streams may be effected within the adsorber near the points of solids entry by means of coils contained therein. Also, as a preferred means of heating and cooling the solid, liquid may be withdrawn from the vessels at appropriate points, heated or cooled externally, and readmitted to the adsorber or desorbers at lower points to effect the desired heating or cooling. Heating and cooling means, however, do not comprise a part of the present invention.

In each of the processes illustrated by the drawings the vapor products and liquid products withdrawn from the appropriate vessels are contaminated with impurities such as water, entrained solids, etc. These impurities are removed by conventional means such as water scrubbing, filtering, centrifuging, passage through cyclone separation or settling zones, etc. and do not constitute any part of this invention.

It is also to be understood that during the adsorption-desorption cycle some of the adsorbent will become deactivated thus requiring regeneration. The latter is also carried out by conventional means such as withdrawal of a fraction of the solid preferably from the desorbed stream and subjecting it to higher temperatures, i. e. to temperatures in the range of 700°–1600° F., and to the action of stripping gases, e. g. steam, flue gas, $CO_2$, etc. to remove deactivants. Thus, a stream of desorbed adsorbent is removed from line 17 and sent to reactivator 37 via pipe 36. Steam or other reactivating gases, as previously mentioned, enters vessel 37 via line 38 and at the temperatures employed, namely, approximately 700° F. to 1600° F., strips deactivants such as polymeric materials from the adsorbent. The reactivating gases and deactivants are removed from the vessel via line 39 and the reactivated char is removed from the vessel via line 40. The latter is cooled and employed again in the main adsorption process or in the tail gas scrubber.

When the system is operated employing a fluidized adsorbent in the adsorbent tower the adsorbent is handled as a dense fluid bed in which the particles average approximately 50–200 micron particle size. The particles possess considerable motion relative to each other and plates or packing are required in the tower in order to effect sufficient countercurrent contact between the adsorbent and vapor. The tower may be supplied with perforated plates equipped with simple standpipe overflows, the vapor passing upwardly through the plate perforations at a velocity sufficiently high to prevent downward passage of charcoal therethrough, and to provide good solids fluidization. Packing or bubble cap plates can also be employed. Approximately 1 to 3 feet of dense bed and 2 feet of vapor disengaging space per plate are adequate to establish a satisfactory approach to equilibrium between vapor and solid. In the moving-bed type of operation the feed gas is fed to the tower at a point near the center thereof. The tower is packed with an adsorbent of approximately 10 to 30 mesh in size which in the case of charcoal would amount to a bulk density of about 30 lbs. per cu. ft. The tower is operated under a pressure of about 50 to 100 p. s. i. g., for example. The packed adsorbent gravitates at a predetermined rate from the top to the bottom of the tower as previously described.

The charcoal inventory in a tower of a given diameter and height is much smaller when the adsorbent is fluidized than when it is handled as a moving bed, and fluidized solids permit much higher tower vapor velocities. Also much higher heat transfer coefficients are obtained with fluidized solids than with close packed solids.

The invention is generally applicable to fractionation processes of the type illustrated above, involving selective adsorption of one or more components from a mixture containing other components which are more and less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbent.

The process is particularly applicable to the recovery of $C_2$ and $C_3$ hydrocarbons from refinery fuel gas; to the recovery of light ends from low pressure catalytic cracking gases; to the recovery of hydrocarbons and oxygenated compounds from hydrocarbon synthesis gas produced at low pressures; to the separation of methane from nitrogen; to the recovery of acetylene from the gases of the Wulff process; to the drying of light gases and air, and to the recovery of valuable solvents such as benzene from gases containing it.

What is claimed is:

1. In a cyclic process for the separation of a fluid mixture containing a less readily adsorbed component A and a more readily adsorbed component B by means of adsorption on a solid adsorbent in an adsorption zone in which the fluid mixture is countercurrently contacted with the adsorbent to adsorb component B, a fluid stream comprising components A and B removed from the adsorption zone, the adsorbent containing component B desorbed to release component B therefrom, and the desorbed adsorbent returned to the adsorption zone, the improvement which comprises partially desorbing component B from the total adsorbent in a partial desorption zone, completely desorbing component B from a minor portion of the adsorbent in a clean-up desorption zone, returning the partially desorbed adsorbent to the adsorption zone, and scrubbing the fluid stream comprising components A and B in a scrubbing zone with the completely desorbed adsorbent to assure complete removal of component B from component A.

2. A process according to claim 1 in which the desorption in both zones is carried out by steam stripping.

3. A process according to claim 1 in which the adsorbent is removed from the scrubbing zone and introduced into the adsorption zone.

4. A process according to claim 1 in which the fluid mixture is a liquid mixture in which component A is methyl cyclohexane and component B is toluene, and in which the solid adsorbent is silica gel.

5. A process according to claim 1 in which the fluid mixture contains a mixture of hydrocarbons in which component A is $C_2$ hydrocarbons and less adsorbable gases and component B is predominantly $C_3$ and $C_4$ hydrocarbons.

6. A process according to claim 1 in which the fluid mixture is a gaseous mixture containing hydrocarbons in which component A is $C_2$ hydrocarbons and less adsorbable gases and component B is predominantly $C_3$ hydrocarbons.

7. A process according to claim 1 in which the adsorbent is activated carbon and in which a portion of the carbon from the clean-up desorption zone is fed to a high temperature regeneration zone.

8. A process for the separation of a fluid mixture comprising a less readily adsorbed component A, a more readily adsorbed component C and an intermediate component B by means of adsorption by a solid adsorbent which comprises passing said adsorbent downwardly through a contacting zone having an adsorption section above a fluid mixture feed-point and a rectification section below said feed-point, feeding the fluid mixture to a lower portion of the adsorption section to adsorb components B and C, removing a fluid stream comprising unadsorbed components A and B from an upper portion of the adsorption section, refluxing the adsorbent in the rectification section with a fluid comprising component C introduced at a lower section of the rectification section, removing a fluid stream comprising components B and C from an upper portion of the rectification section, passing the adsorbent downwardly from the rectification section into a partial desorption zone, partially desorbing component C from the total adsorbent in the partial desorption zone with the aid of a stripping medium introduced from a clean-up desorption zone, removing a fluid stream comprising component C from the partial desorption zone, passing a minor portion of the adsorbent from the partial desorption zone into a clean-up desorption zone, completely desorbing component C from the adsorbent in the clean-up zone by stripping it with a stripping medium introduced into the clean-up desorption zone, returning the partially desorbed adsorbent from the partial desorption zone to the adsorption zone, and scrubbing at least one of the fluid streams comprising components A and B and components B and C respectively in a scrubbing zone with the completely desorbed adsorbent.

9. A process according to claim 8 in which the fluid stream comprising component A is scrubbed with the completely desorbed adsorbent and the adsorbent returned from the scrubbing zone to the adsorption section.

10. A process according to claim 8 in which the fluid stream comprising component B is scrubbed with the completely desorbed adsorbent and the adsorbent returned from the scrubbing zone to the rectification section.

11. A process according to claim 8 in which the fluid mixture comprises a hydrocarbon mixture in which component A is methane and less adsorbable gases such as nitrogen, carbon monoxide and hydrogen, component B is $C_2$ hydrocarbons, and component C is $C_3$ and heavier hydrocarbons, and in which the adsorbent is activated carbon.

ROBERT P. CAHN.
LEWIS D. ETHERINGTON.

References Cited in the file of this patent

UNITED STATES PATENTS

| Number | Name | Date |
|---|---|---|
| 1,830,178 | Speer Jr. | Nov. 3, 1931 |
| 1,836,301 | Bechthold | Dec. 15, 1931 |
| 2,519,342 | Berg | Aug. 22, 1950 |
| 2,523,149 | Scheeline | Sept. 19, 1950 |
| 2,529,289 | Gilliland | Nov. 7, 1950 |
| 2,630,877 | Berg | Mar. 10, 1953 |

OTHER REFERENCES

Publication, "Hypersorption . . . Light Gases," by Clyde Berg, Transactions of A. I. Ch. E., August 25, 1946, pp. 665–680.